O. G. BOGGS.
SIFTER.
APPLICATION FILED FEB. 11, 1908.

948,494.

Patented Feb. 8, 1910.

Witnesses
James F. Crown
M. L. Skinner.

Inventor
Olla G. Boggs
By Watson E. Coleman
Attorney

UNITED STATES PATENT OFFICE.

OLLA GALLAWAY BOGGS, OF SHAWNEE, OKLAHOMA.

SIFTER.

948,494. Specification of Letters Patent. Patented Feb. 8, 1910.

Application filed February 11, 1908. Serial No. 415,361.

*To all whom it may concern:*

Be it known that I, OLLA GALLAWAY BOGGS, a citizen of the United States, residing at Shawnee, in the county of Pottawatomie and State of Oklahoma, have invented a new and useful Sifter, of which the following is a specification.

My invention relates to sifters designed for use in sifting flour or the like, to separate foreign matter therefrom, and it consists in the construction and arrangement of parts, as will be hereinafter described and particularly pointed out in the claim.

Figure 1:
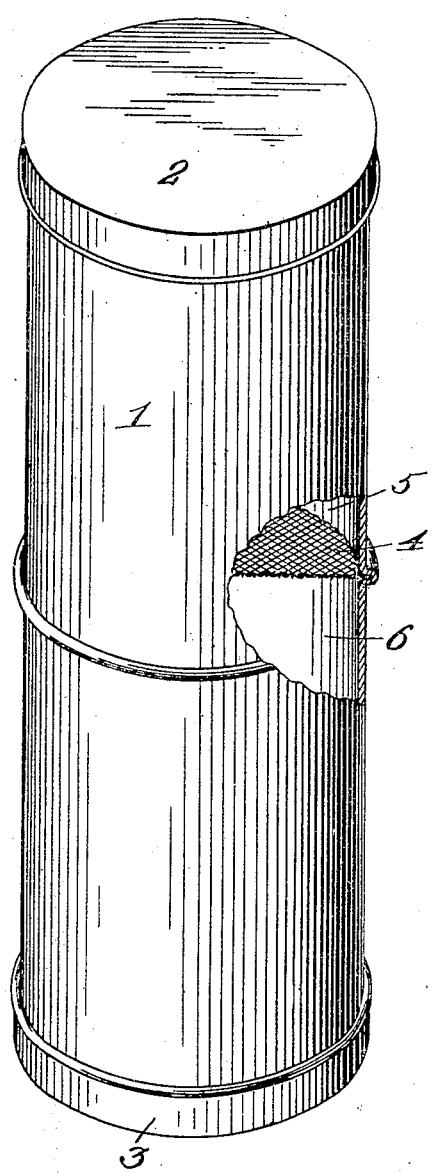
Figure 2:
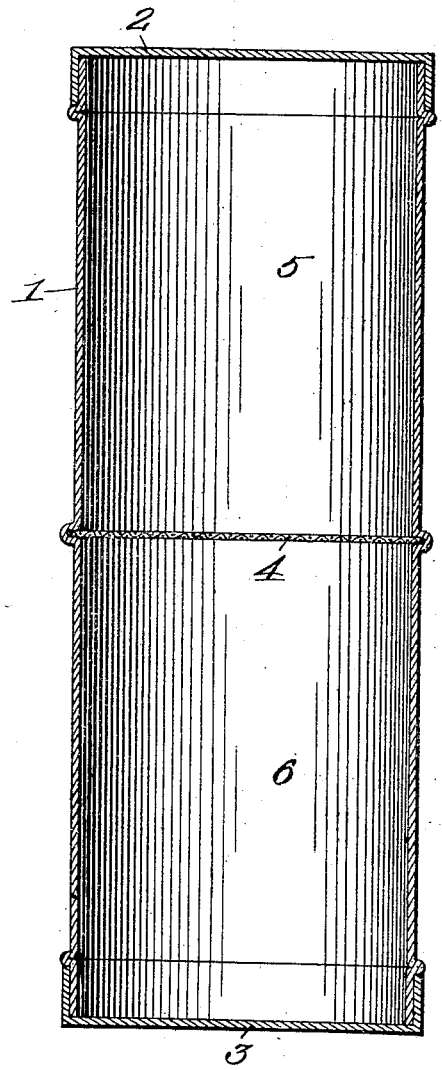

In the accompanying drawing Figure 1 is a perspective view of my flour sifter; and Fig. 2 is a longitudinal sectional view of the same.

Referring to the drawings the numeral 1 designates a single cylindrical section with open ends which are closed by detachable covers 2 and 3. A screw 4, is secured centrally to said section so as to form separately oppositely disposed compartments 5 and 6 of equal sizes between said covers and said screen, said sifter being reversible to permit of the contents of one compartment being sifted into the other.

In using the device the cover on one compartment is removed, with the cover on the other end fixed thereon, the flour is then put in the open compartment and closed by the cover. The utensil is then shaken until the flour is shaken from the compartment in which it is held to the other compartment. The utensil is then reversed and shaken until the flour is sifted from one compartment to the other. The reversing of the utensil and shaking of the same is repeated until the flour has been sifted a sufficient number of times to properly prepare it for use to which it is intended.

Having thus described my invention what I claim is:

The herein described structure for sifting flour and the like comprising a single cylindrical section with open ends, detachable covers for closing said ends, a screen secured centrally to said section so as to form separated oppositely disposed compartments of equal size between said covers and said screen, said sifter being reversible to permit of the contents of one compartment being sifted into the other, or vice versa, substantially as described.

OLLA GALLAWAY BOGGS.

Witnesses:
FRANCES HEFLIN HUGHES,
FRANK W. BOGGS.